Dec. 25, 1951   J. S. ZUCKERMAN   2,580,210
SELF-CONTAINED COOLER USING DRY ICE REFRIGERANT
Filed Aug. 22, 1949
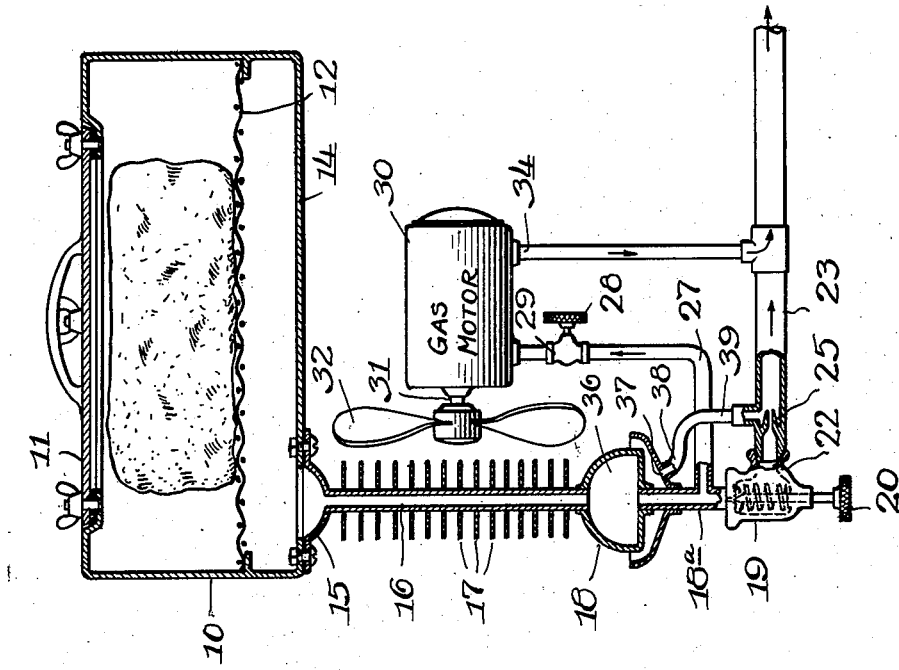
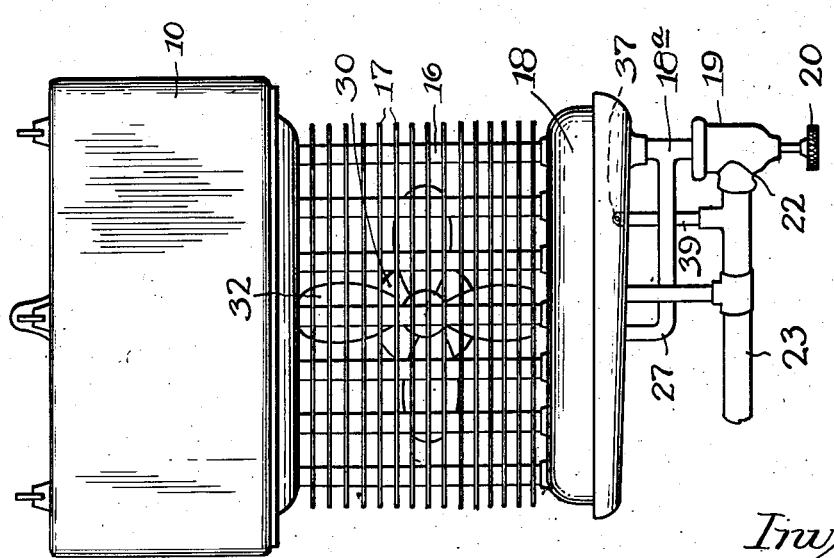
Inventor,
Joseph S. Zuckerman
Robert L. Kahn
Atty.

Patented Dec. 25, 1951

2,580,210

UNITED STATES PATENT OFFICE 2,580,210

SELF-CONTAINED COOLER USING DRY ICE REFRIGERANT

Joseph S. Zuckerman, Chicago, Ill.

Application August 22, 1949, Serial No. 111,637

5 Claims. (Cl. 62—91.5)

This invention relates to a cooler and particularly to a cooler using Dry Ice or similar material for use in portable units. A structure embodying the invention has numerous applications such as for example in automobiles, trucks, freight cars and other vehicles for transporting human beings and transporting freight requiring refrigeration. A structure embodying the present invention may also be used in homes and other places where a permanent installation is unnecessary or uneconomical, or where a temporary installation is required, as in a sick room.

The invention contemplates a structure utilizing Dry Ice as the refrigerating medium. As is well known, Dry Ice is solid carbon dioxide and is sold in such form in numerous places. Dry Ice has substantial refrigeration possibilities. However, its greatest drawback has been that devices for utilizing Dry Ice as a refrigerant medium have not been very efficient or where efficiency has been attained, the apparatus has been complicated and expensive.

This invention contemplates a structure which is simple and fool-proof and in which the refrigeration potential of Dry Ice is utilized in an effective and efficient manner. Contrary to most prior art systems, a structure embodying the present invention does not require any source of power other than the Dry Ice and dispenses with the necessity for electricity.

A structure embodying the present invention in general has a container in which Dry Ice is disposed and an evaporator through which gaseous carbon dioxide may pass. The evaporator is connected to the Dry Ice container so that carbon dioxide evaporating from the main body of Dry Ice may pass through the evaporator. From the evaporator, a pressure reducing valve is provided to an exhaust. Connected across the pressure reducing valve is a gas motor or turbine adapted to drive a fan blowing air against the evaporator. Thus the drop in pressure of carbon dioxide across the pressure reducing valve is utilized for obtaining a flow of air past or through the evaporator.

A system embodying the present invention has numerous and many advantages. First of all, the system is simple and has few parts. Then the system is independent and self-contained and requires no current of electricity for driving a fan. The amount of refrigeration obtained by a unit embodying the present invention is generally proportional to the load, this of course being highly desirable.

Thus in a system embodying the present invention, if the load is light, little carbon dioxide will evaporate and the motor or turbine driven by gaseous carbon dioxide will not be operating at high speed. On the other hand, if the load is substantial, the evaporation of carbon dioxide occurs at a substantial rate and the entire operation of the unit occurs at an accelerated rate.

The structure embodying the present invention also has means for eliminating condensed water or moisture at the evaporator coils, such means for elimination being simple and also forming part of the carbon dioxide discharge path.

In order that the invention may be understood, it will now be explained in connection with the drawings wherein Figure 1 shows a front view of a simple unit embodying the present invention, while Figure 2 shows a side view partly in section of the unit shown in Figure 1.

The unit embodying the invention includes storage chamber 10 of metal or other suitable material in which Dry Ice may be disposed in solid form. Chamber 10 is provided with cover 11 with suitable gasket and clamping means for maintaining the same in position so that chamber 10 may be sealed against pressure developed in the storage chamber incident to the storage of Dry Ice. Inasmuch as pressure resistant and gas-proof chambers of this type are well known in pressure cookers and other devices, a detailed description thereof appears to be unnecessary. In general, however, chamber 10 may be made of such material as iron or steel or aluminum and may be provided with shelf 12 of wire gauze within the chamber for supporting a piece of Dry Ice.

Chamber 10 has bottom 14 to which is attached top header 15. Header 15 may be attached to the bottom or any other part of the chamber in any desired fashion as by bolting thereto. Connected to header 15 is radiator 16 of metal, such as copper or aluminum. The various parts of the radiator are joined together by cooling fins 17 of copper, aluminum or other material. The cooling fins may be attached to the tubing in any particular fashion, or if desired, tubing may be used having fins integral therewith, all this being well known in the refrigeration and heat exchange art.

The bottoms of radiator tubes 16 are attached to lower header 18. Such radiators with top and bottom headers are commonly used in automobiles and in automobile heaters of the hot water type.

Header 17 is connected by pipe 18a to the inlet of pressure reducing or relief valve 19 having manual adjustment knob 20 thereon for determining the outlet pressure. Inasmuch as pressure reducing valves are known, a detailed description thereof is unnecessary. In general, however, any desired type of pressure reducing valve may be used. Pressure reducing valve 19 has outlet 22 connected to exhaust pipe 23. Disposed within exhaust pipe 23 near part 22 thereof is Venturi section 25.

Branching from pipe 18a is pipe 27 leading to valve 28 whose outlet 29 communicates with gas motor 30. Gas motor 30 has shaft 31 carrying fan 32 disposed in proximity to cooling fins 17. The direction of rotation of fan 32 may be as desired to blow air either from the motor through the cooling unit or from the cooling unit through the fan to the motor. Gas motor 30 may be of any desired type operating with compressed gas and in the simplest form may comprise a turbine of any construction. Gas motor 30 has outlet 34 connected into exhaust pipe 23.

The cooling unit is normally positioned as shown in Figures 1 and 2 with radiator 16 generally vertical. Bottom header 18 is provided with moisture collecting tray 36. Water due to condensation upon the evaporator surface may thus collect. Tray 36 is provided with outlet 37. The tray is preferably so mounted that liquid in the tray tends to empty through outlet 37. Outlet 37 has water discharge pipe 38 connected thereto with outlet end 39 of this pipe connected to exhaust 23 in proximity to venturi 25. Any water in pipe 38 may go into exhaust pipe 23.

The operation of the cooler is as follows: Assume that a mass of Dry Ice is disposed in chamber 10 with cover 11 sealed in position. A certain amount of Dry Ice will evaporate from the surface of the solid mass of Dry Ice and the carbon dioxide will settle down through evaporator 16. The evaporated carbon dioxide will absorb heat in evaporator 16. When the pressure in the evaporator reaches or exceeds a certain value, valve 19 will permit gas to discharge into exhaust pipe 23. Thus valve 19 will function as a safety or relief valve.

Since gas motor 30 is connected directly across valve 19 it will have impressed thereon gas pressure substantially equal to the pressure existing across the pressure reducing valve. This will cause motor operation and rotation of fan 32 with a consequent generation of a blast of air or other material past the cooling coil. This results in load being applied to the evaporator.

It is evident that the greater the pressure differential across valve 19, the faster will motor 30 turn. The pressure differential across reducing valve 19 in general will be a function of the load on the unit. The discharge side of valve 19 will generally have a pressure somewhat above atmospheric pressure. The inlet side of pressure reducing valve 19, may vary over a wide range of values depending upon the heat load and in practice may be of the order of five or ten pounds per square inch. Thus gas motor 30 will travel at high speed or low speed depending upon the load.

Generally it may be desirable to adjust the cooling area of the evaporator to the load so that the average surface temperature of the evaporator is above freezing. Thus condensation of water or moisture will result in water dripping to tray 36. As water collects in this tray, aspiration at Venturi section 25 will result in water being drawn off.

If the parts remain in the relative position as shown, namely with pressure reducing valve 19 and exhaust tube 23 below the level of the cooler, it is clear that gravity may be relied upon for removing water from tray 36. However, it is possible to have pressure reducing valve 19 and exhaust pipe 23 at a remote location and normally above the level of the remainder of the apparatus. In such a case aspiration will be effective to remove condensate.

With the gas motor connected as shown, there will be a tendency for the motor to function as a relief valve. Thus by proper proportion of the entire gas motor bypass section including the size of pipe, motor and the like, it is possible to have warm carbon dioxide at exhaust header 18 with just enough pressure to operate the gas motor and maintain relief valve 19 closed. This type of operation may be provided for under normal load. With a heavier load, increased vaporization of carbon dioxide will increase the gas pressure at header 18. This increased gas pressure will drive motor 30 faster and will also have a tendency to open relief valve 19 at intervals or to maintain the valve open a certain amount for continuous escape of some gas, depending upon the type of valve used.

It is also possible to reverse the ice chamber and relief valve connections with respect to the radiator. Thus chamber 10 may be connected directly to lower header 18 while pipe 18a going to valve 19 may be connected to upper header 15. In this way the natural tendency for warm gas to rise in radiator 16 will be used. This would make 15 the exhaust header and 18 the intake header. In general, chamber 10 may have the bottom wall uninsulated as far as heat is concerned so that vaporization of Dry Ice will be promoted. The remaining walls may be heat insulated or not. Generally a film of gas will form around the Dry Ice so that the sides and top of chamber 10 do not function efficiently for cooling. In order to prevent the formation of frost, it may be desirable to insulate the top and sides of chamber 10. The bottom of chamber 10 will preferably be located near the air stream generated by the fan so that frosting will not occur or be minimized.

Gas motor 10 as a rule will not have much heat generated there. However in case the motor runs hot, a ventilating shroud may be provided so that motor heat is carried away by a stream of air to exhaust 23. In fact, a second Venturi section may be provided in exhaust 23 for pulling air from around motor 30 and discharging the same outside of the room or car being cooled.

Exhaust 23 may have a flexible rubber hose attached thereto so that spent carbon dioxide may be discharged outside of a car.

It may be desirable to move venturi 25 and pipe end 39 to a place on exhaust 23 to the right of where pipe 34 comes in (Fig. 2). Thus motor operation will always result in Venturi action irrespective of the condition of valve 19.

What is claimed is:

1. A cooler for use with Dry Ice or the like comprising a closed tank, an evaporator having one end thereof connected to said tank, a relief valve connected at the other end of said radiator and having an exhaust side, an impeller for moving fluid load past said evaporator, a gas motor for driving said impeller, means for connecting said motor across two points in said system having a gas pressure differential, a drip tray for said evaporator, an outlet for said drip tray, a Venturi section disposed at the exhaust side of the relief valve and a connection between said drip outlet and Venturi section whereby exhaust gas will aspirate water from said drip tray.

2. A cooler for use with Dry Ice or the like comprising a closed tank for Dry Ice, an evaporator having a plurality of pipes terminating in inlet and outlet headers, said evaporator being normally disposed so that said pipes extend vertically, a connection from said tank to one of said headers for supplying gaseous carbon dioxide to said header, a relief valve connected to the other header and adapted to exhaust into atmosphere, a fan for blowing air to be cooled against said evaporator, a gas motor for driving said fan and connections disposing said motor across said relief valve.

3. The system according to claim 2 wherein the motor bypass portion of the system is adapted to accommodate and discharge substantially all gas under normal load so that the relief valve need not open except under increased load.

4. The system according to claim 2 wherein a pipe at the exhaust side of the relief valve is provided, a Venturi section in said pipe, a drip tray for said radiator and a pipe connection between said venturi and drip tray whereby the exhaust gas will aspirate condensate from said drip tray.

5. A cooler for use with Dry Ice or the like comprising a closed tank for Dry Ice, an evaporator having a plurality of pipes in parallel with top and bottom headers, said evaporator normally having the pipes running vertically, means for supporting said tank above said evaporator, a connection from the bottom of said tank to one of said headers, an exhaust valve connected to the other header and exhausting to atmosphere, a fan for moving air past said evaporator, a gas motor for driving said fan, connections disposing said motor across said relief valve, a drip tray for said evaporator, a pipe attached to the exhaust side of said valve, a Venturi section in said pipe and a drain pipe connecting said Venturi section and drip tray whereby exhaust gas may aspirate condensate from drip tray.

JOSEPH S. ZUCKERMAN.

REFERENCES CITED

The following references are of record in the file of this patent:

UNITED STATES PATENTS

| Number | Name | Date |
|---|---|---|
| 1,917,865 | Wood | July 11, 1933 |
| 1,917,866 | Wood | July 11, 1933 |
| 2,034,139 | Grayson | Mar. 17, 1936 |
| 2,046,451 | Grayson | July 7, 1936 |